US009100817B1

(12) United States Patent
Reeves et al.

(10) Patent No.: US 9,100,817 B1
(45) Date of Patent: Aug. 4, 2015

(54) METHODS AND SYSTEMS FOR ENFORCING PREPAYMENT BASED ON LACK OF SUPPORT OF AUTHENTICATION FUNCTIONALITY BY A WIRELESS SERVING SYSTEM (71) Applicant: Sprint Spectrum L.P., Overland Park, KS (US)

(72) Inventors: Raymond E. Reeves, Oviedo, FL (US); Simon Youngs, Overland Park, KS (US); Mark Peden, Olathe, KS (US); Gary Koller, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/720,600

(22) Filed: Dec. 19, 2012

(51) Int. Cl.
*H04M 11/00* (2006.01)
*H04W 4/24* (2009.01)
*H04M 3/42* (2006.01)
*H04W 4/00* (2009.01)

(52) U.S. Cl.
CPC ...................................... *H04W 4/24* (2013.01)

(58) Field of Classification Search
CPC .. G06Q 20/28; H04N 21/2543; H04W 12/06; H04M 17/00
USPC .......................................................... 455/406
See application file for complete search history.

(56) References Cited

U.S. PATENT DOCUMENTS

| 6,615,042 | B1 | 9/2003 | Britt et al. |
| 6,622,016 | B1 | 9/2003 | Sladek et al. |
| 2002/0187775 | A1* | 12/2002 | Corrigan et al. ............... 455/414 |
| 2004/0048600 | A1* | 3/2004 | Madour et al. ................ 455/408 |
| 2005/0041808 | A1* | 2/2005 | He ................................ 380/248 |
| 2006/0077924 | A1* | 4/2006 | Rune ............................ 370/328 |
| 2007/0083470 | A1* | 4/2007 | Bonner et al. .................. 705/51 |
| 2007/0179796 | A1* | 8/2007 | Taglienti et al. ................ 705/1 |
| 2007/0293216 | A1* | 12/2007 | Jiang ............................ 455/433 |
| 2008/0125116 | A1* | 5/2008 | Jiang ............................ 455/433 |
| 2010/0190492 | A1* | 7/2010 | Jiang ........................ 455/432.1 |
| 2012/0041878 | A1* | 2/2012 | Yim ............................... 705/44 |

OTHER PUBLICATIONS

Gallagher, Michael D. and Snyder, Randall A., Chapter 16, IS-41 Interoperation with Other Networks, Mobile Telecommunications Networking with IS-41, 1997, pp. 329-356, McGraw-Hill, New York, NY.

* cited by examiner

*Primary Examiner* — Timothy Pham (57) ABSTRACT

Disclosed herein are methods and systems for enforcing prepayment based on lack of support of authentication functionality by a particular wireless serving system. In one embodiment, at least one home-core-network entity associated with a home core network of a mobile station receives from a particular wireless serving system a registration request associated with the mobile station. Responsive to receiving the registration request, the at least one home-core-network entity makes a determination as to whether the particular wireless serving system supports authentication functionality. Responsive to the determination being that the particular wireless serving system does not support authentication functionality, the at least one home-core-network entity sends to the particular wireless serving system a registration response that grants the request subject to at least one prepayment requirement.

19 Claims, 6 Drawing Sheets

METHODS AND SYSTEMS FOR ENFORCING PREPAYMENT BASED ON LACK OF SUPPORT OF AUTHENTICATION FUNCTIONALITY BY A WIRELESS SERVING SYSTEM

BACKGROUND

Unless otherwise indicated herein, the materials described in this section are not prior art to the claims and are not admitted to be prior art by inclusion in this section.

A user of a mobile station may subscribe to service from a cellular wireless network that is operated by a wireless service provider. The wireless service provider may be referred to with respect to the mobile station as a home carrier. As such, the cellular wireless network operated by the home carrier may be referred to with respect to the mobile station as a home carrier network.

Typically, a mobile station has a service account with its respective home carrier. With this arrangement, the home carrier may not collect payment for communication by the mobile station until after such communication has occurred. For instance, the home carrier may collect payment for communication by the mobile station at the end of a monthly billing period with respect to various communications engaged in by the mobile station during that monthly billing period.

When the home carrier has agreements with other wireless service providers, the mobile station may engage in communication via cellular wireless networks operated by the other wireless service providers, which may be referred to with respect to the mobile station as roaming carriers. As such, the cellular wireless networks operated by roaming carriers may be referred to with respect to the mobile station as roaming carrier networks.

Typically, when a mobile station that has a service account with its home carrier engages in communication via a roaming carrier network operated by a roaming carrier, the roaming carrier makes a record of the communication engaged in by the mobile station. With this arrangement, the roaming carrier may report the record of the communication by the mobile station to the home carrier after the communication is complete. For instance, the roaming carrier may report the record of the communication by the mobile station at the end of a monthly billing period. The roaming carrier may then collect payment for the communication from the home carrier. With this arrangement, the home carrier may then collect payment for the communication from the subscriber associated with the mobile station.

A typical home carrier network includes a home core network and a plurality of wireless serving systems. In general, a home core network and a wireless serving system each include infrastructure arranged to facilitate wireless communication by served mobile stations. With this arrangement, a mobile station that has a service account with its home carrier may be served by any one of a plurality of wireless serving systems of the home carrier network. Additionally, roaming carrier networks may each include one or more wireless serving systems. As such, the mobile station may also be served by any one of those systems.

OVERVIEW

Typically, a mobile station sends a request to be served by a particular wireless serving system. When possible, the home carrier typically prefers to determine, before granting the request, whether the request was actually sent from the mobile station associated with (e.g., identified in) the request. With this arrangement, the home carrier can verify the identity of the mobile station associated with the request. This type of evaluation in general is referred to as authentication or authenticating. As such, mobile stations that are successfully verified via one or more authentication processes may be referred to as authenticated. Authentication functionality may require support from one or more wireless serving systems. For example, a wireless serving system can support authentication functionality by providing sufficient information to the home carrier such that the home carrier is then able to determine definitively whether the mobile station can be considered authenticated or not authenticated.

Some wireless serving systems, however, do not support authentication functionality. In some such instances, a given wireless serving system may not support authentication functionality due to the costs that would be associated with supporting authentication functionality. In other cases, the reason for lack of support of authentication functionality may relate to equipment and/or software being outdated or otherwise noncompliant. And certainly other reasons could exist as well in various contexts, as could various combinations of reasons. In some situations, when a particular wireless serving system does not support authentication functionality, the home carrier might not be able to authenticate a mobile station (or determine definitively that a mobile station is not authenticated) that requests to be served by the particular wireless serving system.

In certain implementations, when a mobile station that has a service account with its home carrier requests to be served by a particular wireless serving system that does not support authentication functionality, the home carrier may deny the request. With this arrangement, the mobile station may not be served by the particular wireless serving system, even though the mobile station might be authenticated in various other situations, such as when the particular wireless serving system via which the mobile station is connected does support authentication functionality.

In other implementations, when a mobile station that has a service account with its home carrier requests to be served by a particular wireless serving system that does not support authentication functionality, the home carrier may forgo any authentication requirement and simply grant the request. With this arrangement, the mobile station may be served by the particular wireless serving system, even though the particular wireless serving system does not support authentication functionality.

Unfortunately, however, forgoing authentication when the particular wireless serving system does not support authentication functionality may give rise to yet another issue. Namely, mobile stations that are illegitimate, such as mobile stations that may never be authenticated, may engage in communication via the particular wireless serving system. In that situation, it is unclear whether the home carrier may be able to collect payment for the communication. As a result, the home carrier may end up bearing the cost of communications by such mobile stations. Furthermore, the cost may be substantial when such mobile stations engage in expensive communication, such as placing international calls.

Disclosed herein is a method and corresponding system to help overcome this problem as well as others. In accordance with the disclosure, the system may be configured to enforce prepayment based on lack of support of authentication functionality by a particular wireless serving system. By enforcing prepayment based on lack of support of authentication functionality by the particular wireless serving system, the system may reduce or avoid the cost that might otherwise arise from illegitimate mobile stations engaging in communication via wireless serving systems that do not support authentication functionality.

In practice, for instance, a representative method may involve at least one home-core-network entity associated with a home core network of a mobile station receiving from a particular wireless serving system a registration request associated with the mobile station. The method may involve in response to the receiving the registration request, the at least one home-core-network entity making a determination as to whether the particular wireless serving system supports authentication functionality. And the method may involve in response to the determination being that the particular wireless serving system does not support authentication functionality, the at least one home-core-network entity sending to the particular wireless serving system a registration response that grants the request subject to at least one prepayment requirement.

Further, a representative system may include a communication interface, a processing unit, and non-transitory data storage. And the system may include program instructions stored in the data storage and executable by the processing unit to carry out functions of the method.

These as well as other aspects, advantages, and alternatives will become apparent to those of ordinary skill in the art by reading the following detailed description, with reference where appropriate to the accompanying drawings. Further, it should be understood that this overview and the other description provided throughout this document is provided by way of example and is not intended to be limiting.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

I. Introduction

The present methods and systems will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Architecture

A. Example Communication System

Figure 1:
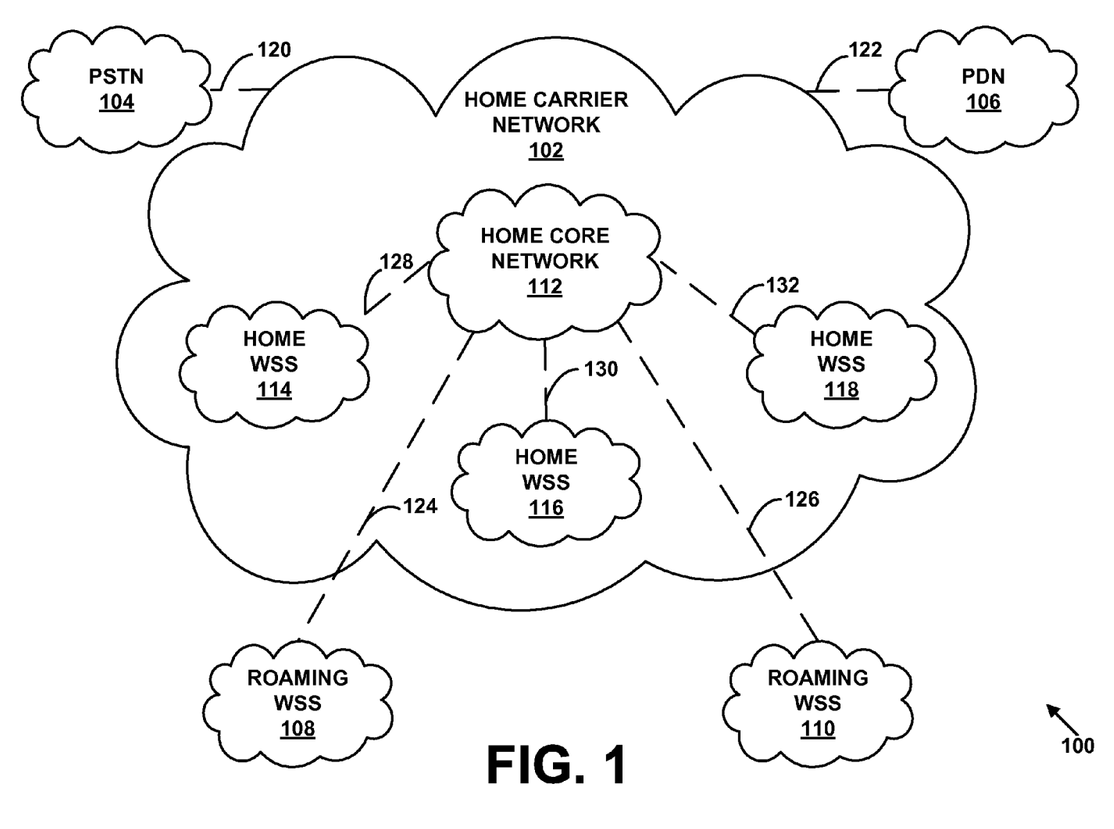
FIG. 1 depicts an example communication system.

Referring to the drawings, FIG. 1 depicts an example communication system 100 that includes a home carrier network 102, a public switched telephone network (PSTN) 104, a packet-data network (PDN) 106, a roaming wireless serving system 108, and a roaming wireless serving system 110. Home carrier network 102 includes home core network 112, home wireless serving system 114, home wireless serving system 116, and home wireless serving system 118. Home carrier network 102 communicates with PSTN 104 via a logical communication link 120, and with PDN 106 via a logical communication link 122. Home core network 112 communicates with roaming wireless serving system 108 via a logical communication link 124, with roaming wireless serving system 110 via a logical communication link 126, with home wireless serving system 114 via a logical communication link 128, with home wireless serving system 116 via a logical communication link 130, and with home wireless serving system 118 via a logical communication link 132. Any or all of the logical communication links described herein may include one or more wired and/or wireless interfaces. Also, there could be one or more routers, switches and/or other devices or networks making up at least part of one or more of each of the logical communication links described herein.

B. Example Home Core Network

Figure 2:
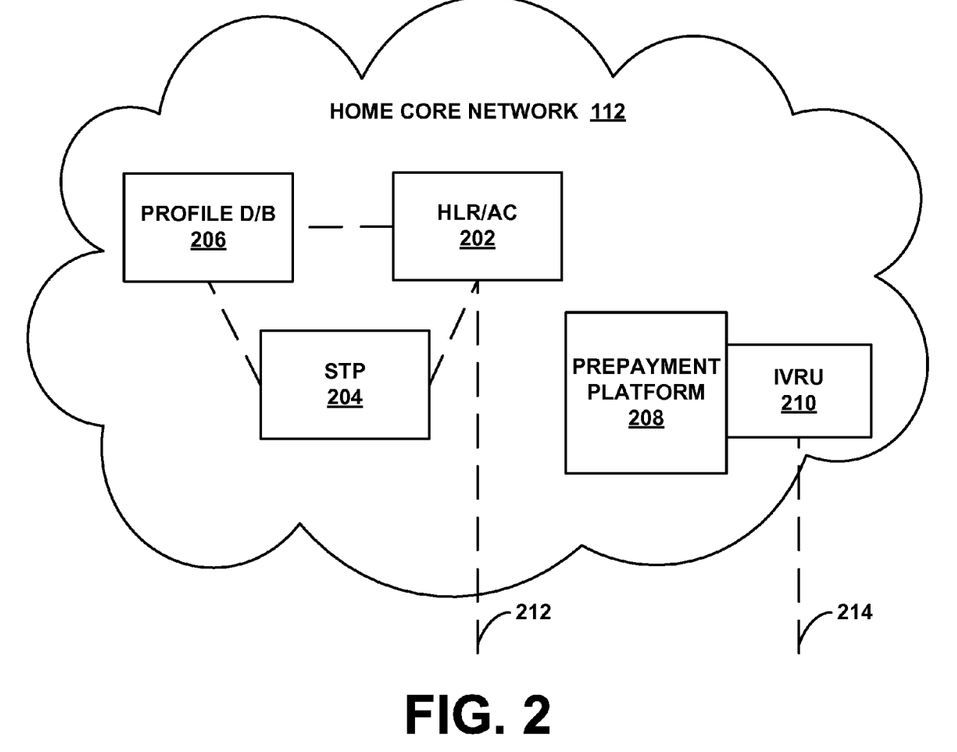
FIG. 2 depicts an example home core network.

FIG. 2 offers a more detailed depiction of home core network 112, which is shown in this example as including a home location register and authentication center (HLR/AC) 202, a signal transfer point (STP) 204, a profile database 206, a prepayment platform 208, and an interactive voice response unit 210. In this example, prepayment platform 208 is connected to the interactive voice response unit 210. HLR/AC 202 communicates with STP 204 via a logical communication link, and with profile database 206 via a logical communication link.

HLR/AC 202 communicates with roaming wireless serving system 108, roaming wireless serving system 110, home wireless serving system 114, home wireless serving system 116, and home wireless serving system 118 via a logical communication link 212. Logical communication link 212 may represent any one or any combination of logical communication link 124, logical communication link 126, logical communication link 128, logical communication link 130, and logical communication link 132. Interactive voice response unit 210 communicates with roaming wireless serving system 108, roaming wireless serving system 110, home wireless serving system 114, home wireless serving system 116, and home wireless serving system 118 via a logical communication link 214. Logical communication link 214 may represent any one of logical communication link 124, logical communication link 126, logical communication link 128, logical communication link 130, and logical communication link 132.

Other entities could be present in addition to and/or instead of one or more of the entities depicted in FIG. 2, as this arrangement is presented by way of example. And other variations are possible as well. For example, in some embodiments, HLR/AC 202 may be two or more separate entities, such a home location register (HLR) and an authentication center (AC). In another embodiment, profile database 206 is located in HLR/AC 202.

HLR/AC 202 may serve standard functions in the home core network 112, such as managing service profile records stored in profile database 206 and also managing authentication information for mobile stations. STP 204 generally signals to one or more policy decision points, in accordance with a protocol such as Signaling System #7 (SS7). Prepayment platform 208 in connection with interactive voice response unit 210 may collect payment (e.g., prepayment on which receipt of one or more communication services is continued) from mobile stations according to at least one embodiment described herein.

C. Example Wireless Serving System

Figure 3:
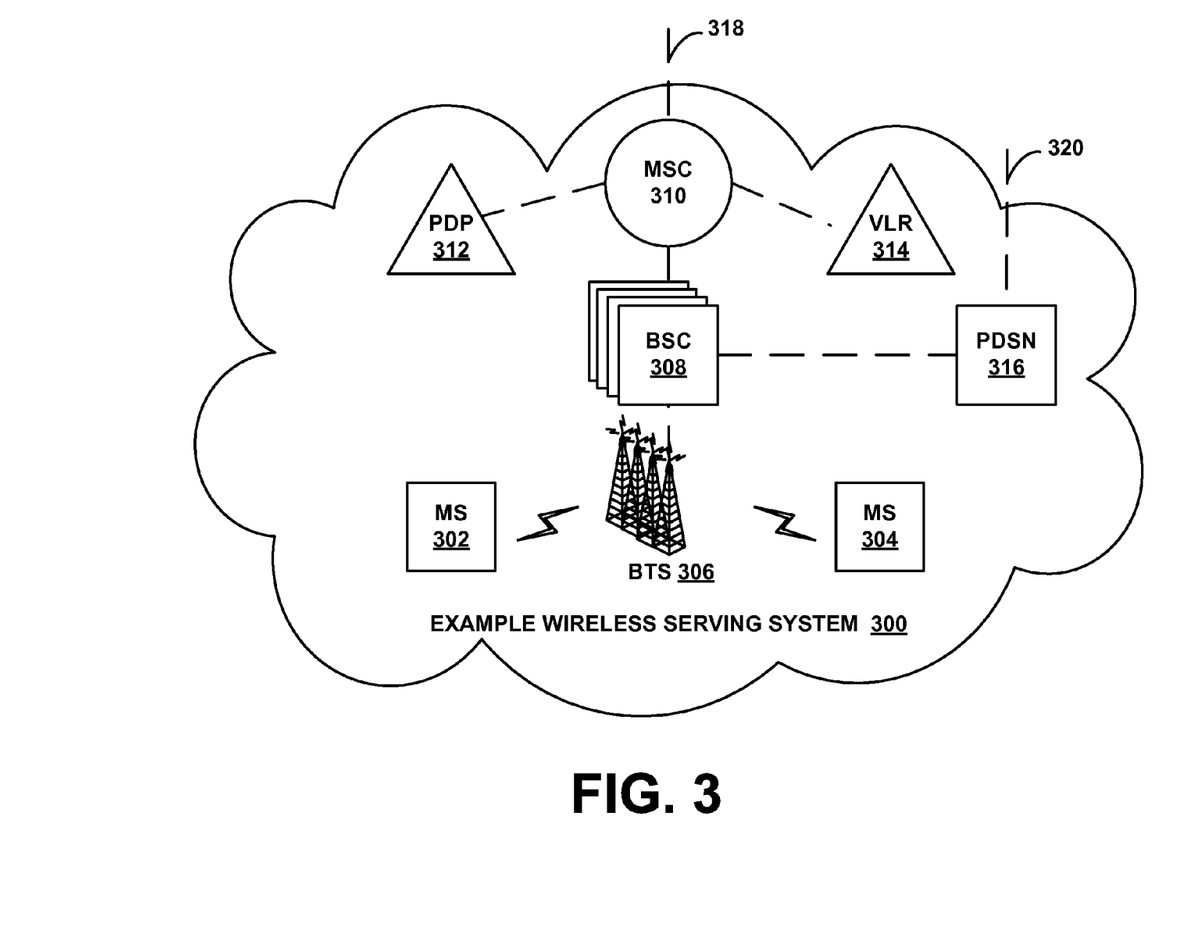
FIG. 3 depicts an example wireless serving system.

FIG. 3 depicts an example wireless serving system 300, as including a mobile station 302, a mobile station 304, a plurality of base station transceivers (BTSs) 306, a plurality of base station controllers (BSCs) 308, a mobile switching center (MSC) 310, a policy decision point 312, a visiting location register (VLR) 314, and a packet data serving node (PDSN) 316. MSC 310 communicates with policy decision point 312, with VLR 314, and with PTSN 104 via respective logical communication links (not all of which are depicted). MSC 310 communicates with at least one home-core-network entity, such as HLR/AC 202 and/or interactive voice response unit 210, via a logical communication link 318. Logical communication link 318 may represent any one of logical communication link 212 and logical communication link 214. PDSN 316 communicates with PDN 106 via a logical communication link 320.

BSC 308 communicates with MSC 310, with BTS 306, and with PDSN 316 via respective logical communication links. Mobile station 302 and mobile station 304 each communicate with BTS 306 via an air interface. In some embodiments, mobile station 302 and mobile station 304 each have a service account with home carrier network 102. Other entities could be present in addition to and/or instead of one or more of the entities depicted in FIG. 3, as this arrangement is presented by way of example. And other variations are possible as well. It is contemplated that any one or more of roaming wireless serving system 108, roaming wireless serving system 110, home wireless serving system 114, home wireless serving system 116, and home wireless serving system 118 may each have an arrangement similar to that of example wireless serving system 300.

Any one or more of BTSs 306 generally function to provide one or more coverage areas on one or more carrier frequencies, and to interface between air-interface communications with mobile stations on the one hand and "backhaul" communications with any one or more of BSCs 308 on the other hand. Any one or more of BSCs 308 generally function to control one or more BTSs, and to provide one or more BTSs with connections to devices such as MSC 310 and PDSN 316. MSC 310 generally functions to connect BSCs to circuit-switched networks, such as PTSN 104, and serves at least a telephone-switch function to facilitate such connections. Policy decision point 312, which may be a signal control point (SCP), signals to STP 204. VLR 314 may store service profile records for mobile stations currently being served by example wireless serving system 300. PSDN 316 generally functions to connect BSCs to packet-switched networks such as PDN 106, which could be the Internet, and serves at least a network-access-server (NAS) function to facilitate such connections.

D. Example Home-Core-Network Entity

Figure 4:
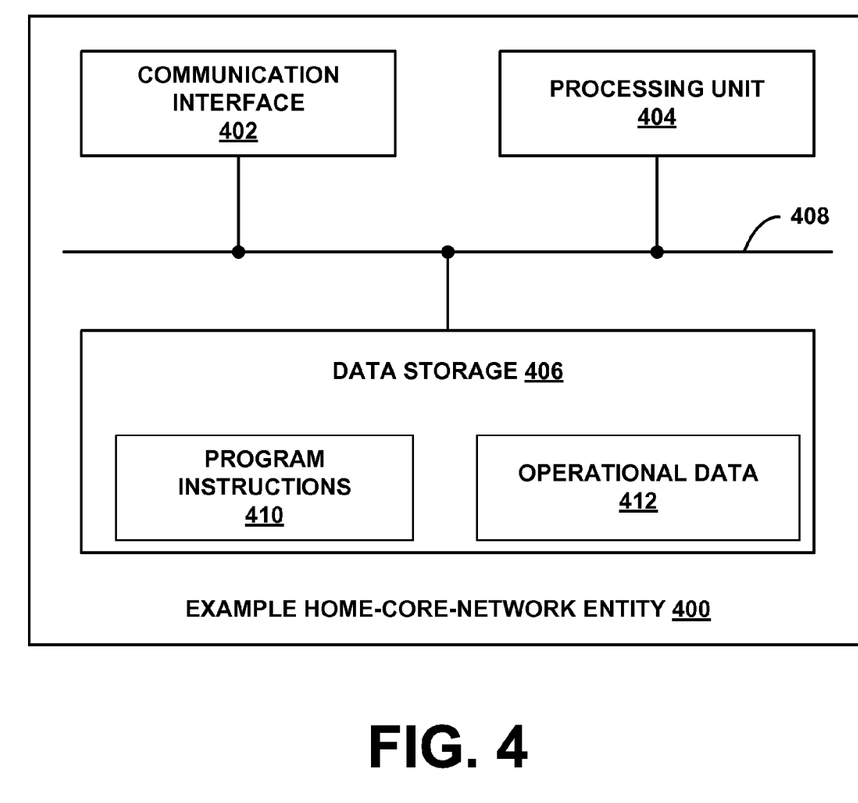
FIG. 4 depicts an example home-core-network entity.

FIG. 4 depicts an example home-core-network entity 400, such as HLR/AC 202 or STP 204, as but a few examples, though any network-side communication entity described herein may have a structure similar to that described with respect to entity 400. As shown, entity 400 may include a communication interface 402, a processing unit 404, and data storage 406, all of which may be coupled together by a system bus, network, or other communication mechanism 408.

Communication interface 402 may comprise an antenna arrangement (not shown) and/or associated components such as a modem, for instance, to facilitate wireless and/or wired data communication with one or more entities. Processing unit 404 may comprise one or more general-purpose and/or one or more special-purpose processors, and may be integrated in whole or in part with communication interface 402. Data storage 406 may comprise one or more volatile storage components (such as magnetic, optical, flash, or other non-transitory storage) and may be integrated in whole or in part with processing unit 404. As shown, data storage 406 may hold program instructions 410 that are executable by processing unit 404 to carry out various functions. Additionally, data storage 406 may hold operational data 412 which comprises information that is collected and stored as a result of the functions carried out by executed program instructions 410. And other configurations are possible as well.

E. Example Mobile Station

Figure 5:
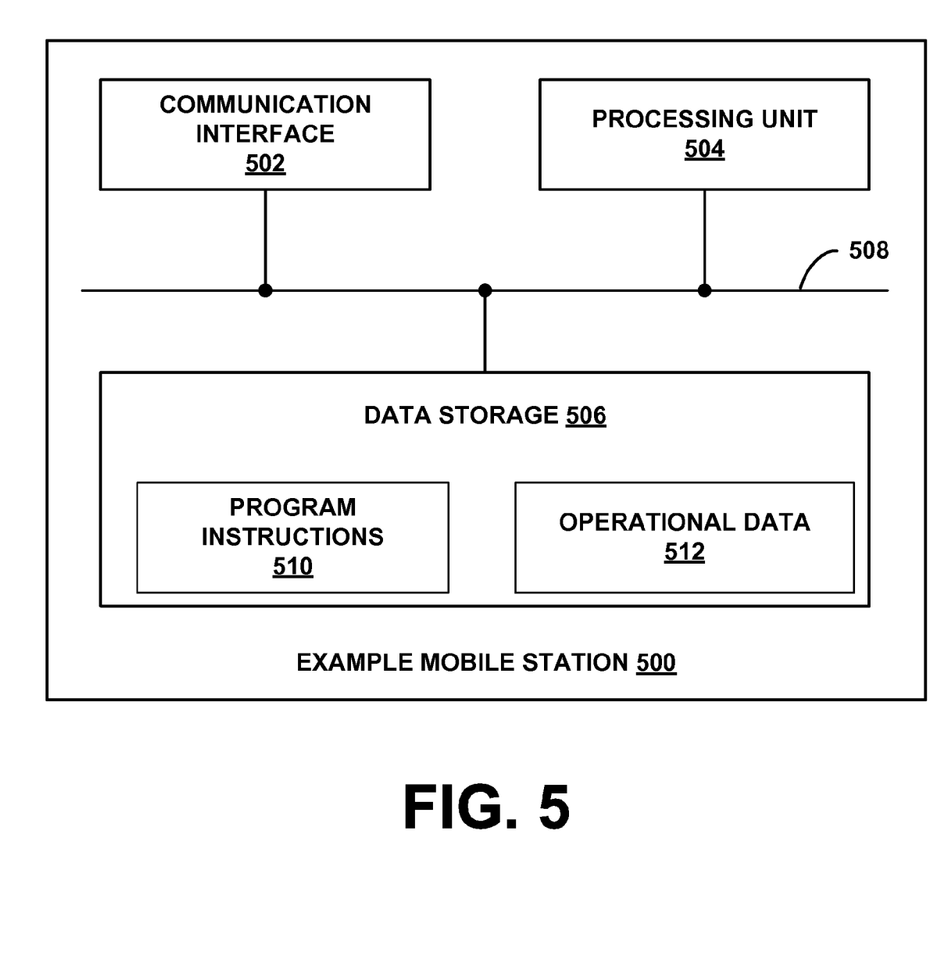
FIG. 5 depicts an example mobile station.

FIG. 5 depicts an example mobile station 500, such as mobile station 302 or mobile station 304, as but two examples, though any device arranged to carry out mobile-station functions described herein may have a structure similar to that described with respect to entity 500. As shown, entity 500 may include a communication interface 502, a processing unit 504, and data storage 506, all of which may be coupled together by a system bus, network, or other communication mechanism 508.

Communication interface 502 may comprise an antenna and a chipset for communicating with one or more BTSs over an air interface. As an example, the chipset could be one that is suitable for code division multiple access (CDMA) communication. The chipset or wireless-communication interface in general may also or instead be arranged to communicate according to one or more other types (e.g., protocols) mentioned herein and/or any others now known or later developed.

Processing unit 504 may comprise one or more general-purpose and/or one or more special-purpose processors, and may be integrated in whole or in part with communication interface 502. Data storage 506 may comprise one or more volatile storage components (such as magnetic, optical, flash, or other non-transitory storage) and may be integrated in whole or in part with processing unit 504. As shown, data storage 506 may hold program instructions 510 that are executable by processing unit 504 to carry out various functions. Additionally, data storage 506 may hold operational data 512 which comprises information that is collected and stored as a result of the functions carried out by executed program instructions 510. And other configurations are possible as well.

As examples, entity 500 could be or include a cell phone, smartphone, personal digital assistant (PDA), or a laptop or tablet computer. In accordance with this disclosure, entity 500 broadly encompasses communication devices that in other contexts may be referred to alternatively or additionally as access terminals, mobile devices, wireless communication devices, user equipment, and the like.

III. Example Operation

Figure 6:
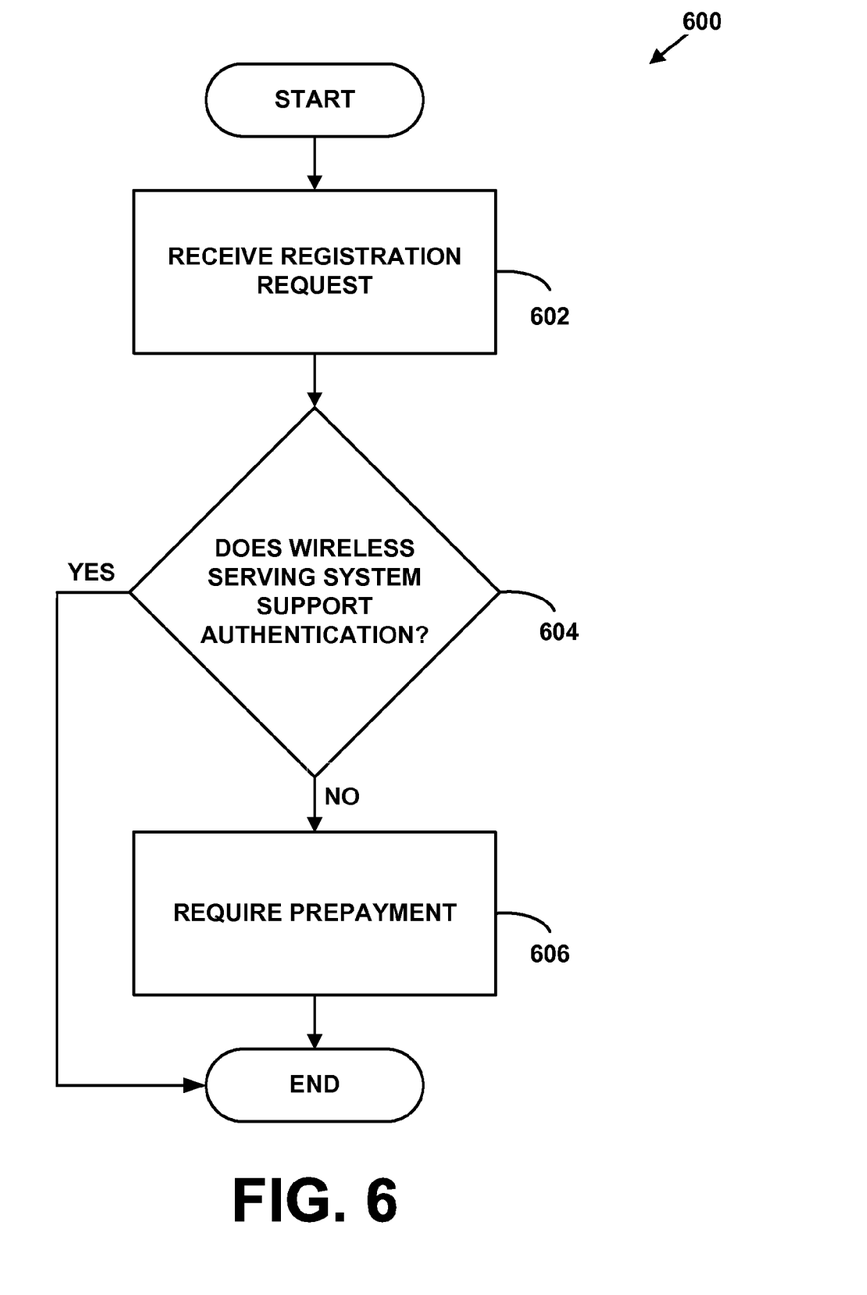
FIG. 6 depicts functions carried out in accordance with at least one embodiment.

FIG. 6 depicts functions carried out in accordance with at least one embodiment. More particularly, FIG. 6 depicts a method 600 carried out by at least one home-core-network entity associated with a home core network of a mobile station, such as HLR/AC 202. It should be understood by those of ordinary skill in the art that the methods and systems described herein can be implemented in networks that operate according to different network protocols, such as CDMA, Evolution Data Optimized (EV-DO), Long Term Evolution (LTE), and the like.

Method 600 begins at 602 with receiving from a particular wireless serving system a registration request associated with the mobile station. In this disclosure, at least in contexts such as (i) a home core network receiving a registration request from (or via) a wireless serving system and (ii) a mobile station engaging in wireless communication via (or from) a wireless serving system, as examples, it should be understood that the word "via" includes the one or more meanings of the word "from," and similarly that the word "from" includes the one or more meanings of the word "via."

In some embodiments, the particular wireless serving system may be a roaming wireless serving system, such as roaming wireless serving system 108 or roaming wireless serving system 110, though in other embodiments the particular wireless serving system can be part of a home carrier network, such as home wireless serving system 114, home wireless serving system 116, or home wireless serving system 118. In some embodiments, the registration request may be or include a Registration Notification message, a call-origination message, and/or one or more other type or types of access requests deemed suitable for a given implementation.

Method 600 continues at 604 with, in response to receiving the registration request, making a determination as to whether the particular wireless serving system supports authentication functionality. In some embodiments, the authentication functionality may be A-key authentication with the home core network. Other and/or additional authentication functionality is also possible.

The determination as to whether the particular wireless serving system supports authentication functionality could take various different forms in various different embodiments. In some embodiments, the registration request may include an indication of whether the particular wireless serving system supports authentication functionality. For example, the registration request may include an indication of whether one or more entities of the particular wireless serving system, such as MSC 310, support authentication functionality. In that embodiment or another embodiment, method 600 may further include receiving from the particular wireless serving system an identifier of the MSC associated with the particular wireless serving system. With this arrangement, the making of the determination as to whether the particular wireless serving system supports authentication functionality may include performing a database lookup to determine based on the identifier of the MSC whether the particular wireless serving system supports authentication functionality. And certainly other approaches could be used as well.

As depicted in FIG. 6, in response to the determination being that the particular wireless serving system does support authentication functionality, method 600 ends.

Otherwise, method 600 continues at 606 with, in response to the determination being that the particular wireless serving system does not support authentication functionality, sending to the particular wireless serving system a registration response that grants the registration request subject to at least one prepayment requirement. In some embodiments, the registration response may be or include a registration notification return result message and/or one or more other type or types of registration responses that correspond to the particular registration requests described herein, such as call-origination messages.

Prepayment requirements could take various different forms in various different embodiments. In some embodiments, one or more prepayment requirements may be or include payment before inbound communication is routed to the mobile station via the particular wireless serving system and/or payment before a call placed by the mobile station is connected via the particular wireless serving system.

In some embodiments, one or more prepayment requirements could apply to particular communication, such as international calls. Alternatively, one or more prepayment requirements could not apply to particular communication, such as emergency or customer service calls. With this arrangement, payment may not be needed before connecting such calls via the particular wireless serving system. Furthermore, one or more prepayment requirements may not apply to particular inbound communication. Such inbound communication could be referred to as a call from a safe number. With this arrangement, payment may not be needed before routing inbound communication to the mobile station via the particular wireless service system. And certainly many other possibilities exist as well.

In various different embodiments, the at least one home-core-network entity could configure (i.e., order, command, request that, instruct that, etc.) the particular wireless serving system to enforce the at least one prepayment requirement according to various different approaches. In some embodiments, the registration response may provide one or more entities of the particular wireless serving system, such as MSC 310, with trigger logic for invoking a prepayment process to enforce the at least one prepayment requirement.

The trigger logic may be an all-digits trigger, though other forms of trigger logic are also possible. As one example, the trigger logic may instruct MSC 310 to signal to a policy decision point, such as policy decision point 312, before routing inbound communication to the mobile station via the particular wireless serving system and/or before connecting a call placed by the mobile station via the particular wireless serving system. In response to receiving the signal, policy decision point 312 may connect the mobile station to the interactive voice response unit 210.

With this arrangement, the interactive voice response unit 210 in connection with the prepayment platform 208 may collect payment before inbound communication is routed to the mobile station via the particular wireless serving system and/or before a call placed by the mobile station is connected via the particular wireless serving system. Alternatively, the policy decision point 312 could connect the mobile station to one or more other entities to enforce the at least one prepayment requirement, such as PDN 106. And other arrangements could also be used in various implementations, as the arrangements described herein are provided by way of example and not by way of limitation.

In another embodiment, the at least one home-core-network entity could send a service logic update to policy decision point 312 defining service logic to connect the mobile station to interactive voice response unit 210 and/or one or more other entities to enforce the at least one prepayment requirement.

In yet another embodiment, method 600 may further include modifying a subscriber profile record of the mobile station to indicate at least one prepayment requirement. With this arrangement, the particular wireless serving system could be configured to enforce the at least one prepayment requirement based on the subscriber profile record.

IV. Conclusion

While some example embodiments have been described above, those of ordinary skill in the art will appreciate that numerous changes to the described embodiments could be made without departing from the scope and spirit of the claims.

The invention claimed is:

1. A method carried out by at least one home-core-network entity associated with a home carrier of a mobile station, the method comprising:

the at least one home-core-network entity receiving from a particular wireless serving system a registration request associated with the mobile station, wherein the particular wireless serving system comprises a mobile switching center (MSC);

in response to receiving the registration request, the at least one home-core-network entity making a determination that the particular wireless serving system does not support authentication functionality of the home carrier, wherein the registration request comprises an indication of whether the particular wireless serving system supports authentication functionality of the home carrier, and wherein the indication of whether the particular wireless serving system supports authentication functionality of the home carrier comprises an indication of whether the MSC supports authentication functionality of the home carrier; and in response to the determination being that the particular wireless serving system does not support authentication functionality of the home carrier, the at least one home-core-network entity sending to the particular wireless serving system a registration response that grants the registration request subject to a requirement of prepayment for communication by the mobile station.

2. The method of claim 1, wherein the particular wireless serving system comprises a roaming wireless serving system.

3. The method of claim 1, wherein the authentication functionality of the home carrier comprises A-key authentication with the home carrier.

4. The method of claim 1, wherein the registration request comprises a Registration Notification message.

5. The method of claim 1, wherein making the determination that the particular wireless serving system does not support authentication functionality of the home carrier comprises performing a database lookup to determine based at least in part on an identifier of the MSC whether the particular wireless serving system supports authentication functionality of the home carrier.

6. The method of claim 1, wherein the home carrier comprises a home location register (HLR), and wherein the at least one home-core-network entity receiving from a particular wireless serving system a registration request associated with the mobile station comprises the HLR receiving the registration request.

7. The method of claim 1, wherein the home carrier comprises a home location register (HLR), and wherein the at least one home-core-network entity making the determination that the particular wireless serving system does not support authentication functionality of the home carrier comprises the HLR making the determination.

8. The method of claim 1, wherein the home carrier comprises a home location register (HLR), and wherein the at least one home-core-network entity sending to the particular wireless serving system a registration response that grants the registration request subject to a requirement of prepayment for communication by the mobile station comprises the HLR sending the registration response.

9. The method of claim 1, wherein the registration response comprises a registration notification return result message.

10. The method of claim 1, wherein the requirement of prepayment comprises requiring payment before inbound communication is routed to the mobile station via the particular wireless serving system.

11. The method of claim 1, wherein the requirement of prepayment comprises requiring payment before connecting a call placed by the mobile station via the particular wireless serving system.

12. The method of claim 1, wherein the registration response provides the particular wireless serving system with trigger logic for invoking a prepayment process to enforce the requirement of prepayment.

13. The method of claim 1, further comprising modifying a subscriber profile record associated with the mobile station to indicate the requirement of prepayment.

14. A system associated with a home carrier of a mobile station, the system comprising:
a communication interface;
a processing unit;
non-transitory data storage; and
program instructions stored in the non-transitory data storage and executable by the processing unit to carry out functions comprising:
upon receiving from a particular wireless serving system, via the communication interface, a registration request associated with the mobile station, the system making a determination that the particular wireless serving system does not support authentication functionality of the home carrier, wherein the particular wireless serving system comprises a mobile switching center (MSC), wherein the registration request comprises an indication of whether the particular wireless serving system supports authentication functionality of the home carrier, and wherein the indication of whether the particular wireless serving system supports authentication functionality of the home carrier comprises an indication of whether the MSC supports authentication functionality of the home carrier; and in response to the determination being that the particular wireless serving system does not support authentication functionality of the home carrier, the system sending to the particular wireless serving system a registration response that grants the registration request subject to a requirement of prepayment for communication by the mobile station.

15. The system of claim 14, wherein the authentication functionality of the home carrier comprises A-key authentication with the home carrier.

16. The system of claim 14, wherein the system sending to the particular wireless serving system a registration response that grants the registration request subject to a requirement of prepayment comprises the system sending to the particular wireless serving system trigger logic for invoking a prepayment process to enforce the requirement of prepayment.

17. The system of claim 14, wherein the requirement of prepayment comprises requiring payment before inbound communication is routed to the mobile station via the particular wireless serving system.

18. The system of claim 14, wherein the requirement of prepayment comprises requiring payment before connecting a call placed by the mobile station via the particular wireless serving system.

19. A method carried out by at least one home-core-network entity associated with a home carrier of a mobile station, the method comprising:
the at least one home-core-network entity receiving from a particular wireless serving system a registration request associated with the mobile station, wherein the particular wireless serving system comprises a mobile switching center (MSC);
the at least one home-core-network entity receiving from the particular wireless serving system an identifier of the MSC;
in response to receiving the registration request, the at least one home-core-network entity making a determination that the particular wireless serving system does not support authentication functionality of the home carrier, wherein making the determination that the particular wireless serving system does not support authentication functionality of the home carrier comprises performing a database lookup to determine based at least in part on the identifier of the MSC whether the particular wireless serving system supports authentication functionality of the home carrier; and in response to the determination being that the particular wireless serving system does not support authentication functionality of the home carrier, the at least one home-core-network entity sending to the particular wireless serving system a registration response that grants the registration request subject to a requirement of prepayment for communication by the mobile station.

\* \* \* \* \*